United States Patent

[11] 3,598,481

[72] Inventor George A. Mitchell
  687 Prospect Crescent, Pasadena, Calif. 91103
[21] Appl. No 23,298
[22] Filed Mar. 27, 1970
[45] Patented Aug. 10, 1971

[54] SHUTTER DRIVE MECHANISM
  2 Claims, 5 Drawing Figs.
[52] U.S. Cl............................................. 352/206
[51] Int. Cl.............................................. G03b 9/8
[50] Field of Search................................. 352/205, 206, 208, 214, 216, 217, 219

[56] References Cited
UNITED STATES PATENTS
1,173,706  2/1916  Carleton.................... 352/216
2,012,352  8/1935  Rusting..................... 352/206
2,858,750  11/1958 Farinet, Jr. ............... 352/216

Primary Examiner—S. Clement Swisher
Attorney—Charlton M. Lewis

ABSTRACT: Variable shutter mechanism for a motion picture camera has the main shutter blade mounted on the forward end of the main shutter shaft and driven in fixed phase relation to the intermittent mechanism, and the variable shutter blade journaled coaxially to the rear of the main blade, leaving the forward end of the main shaft available for driving connection to other apparatus. A reflex shutter may be mounted on an oblique axis forward of the main shutter mechanism, the reflex shutter shaft being coupled directly to the main shaft, preferably via a constant speed universal joint.

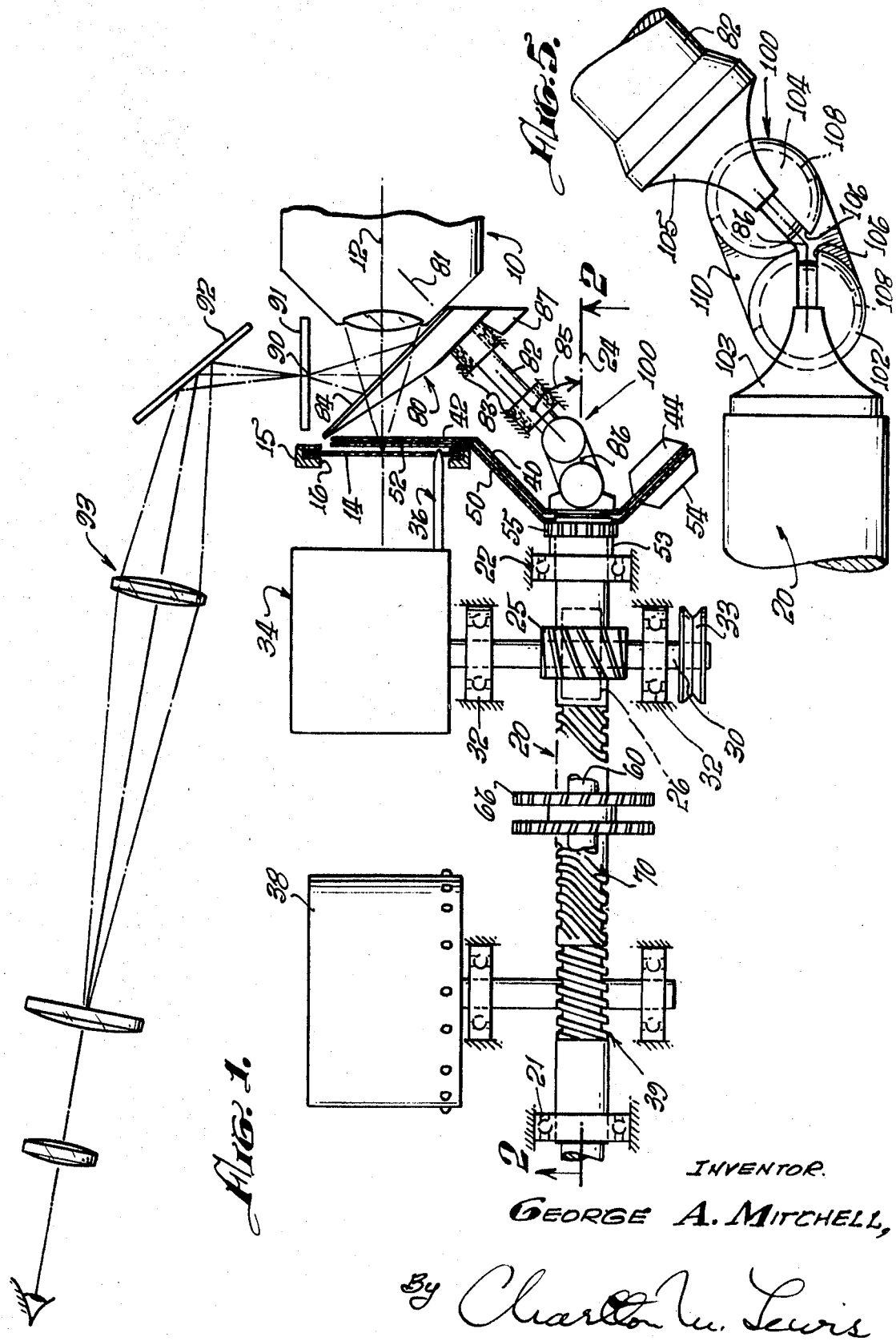

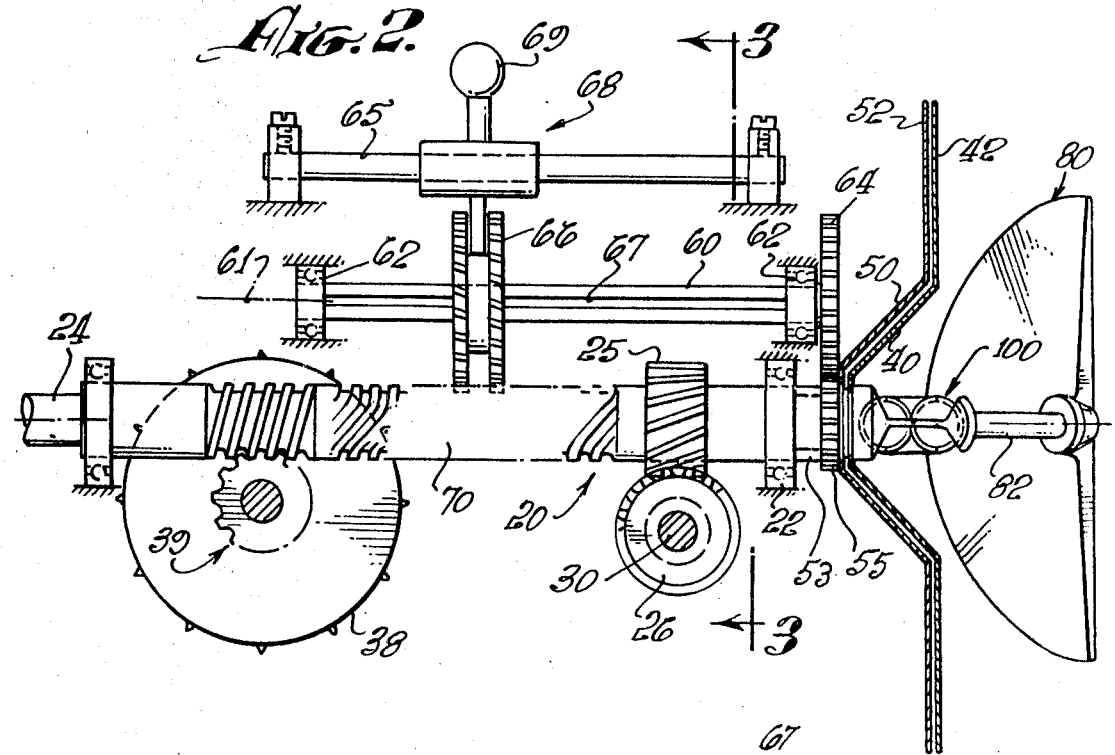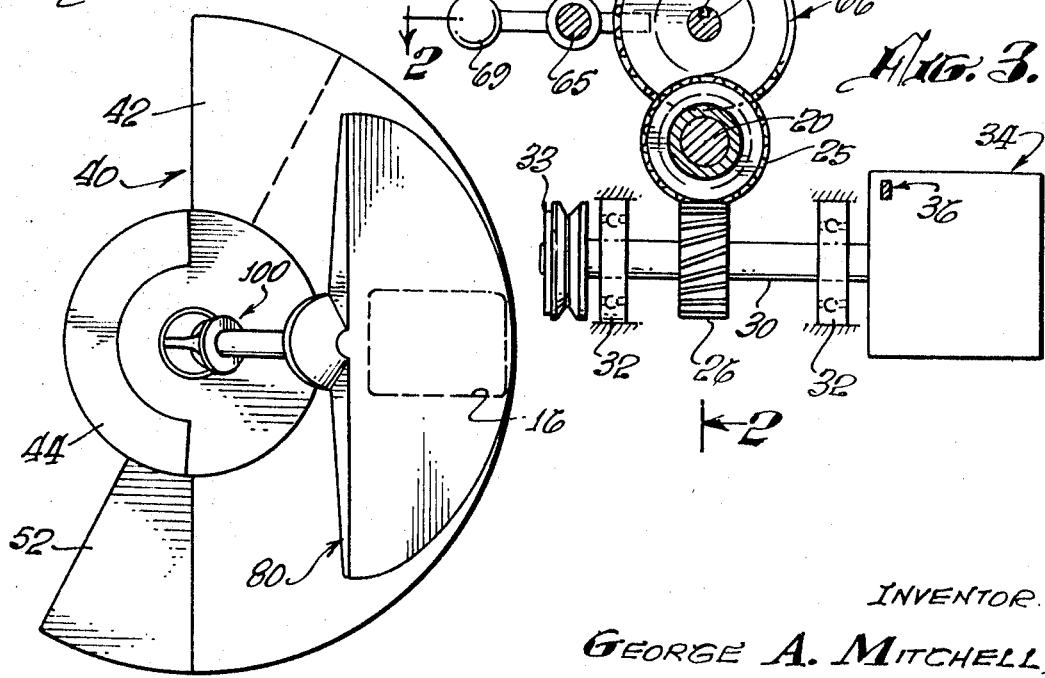

SHUTTER DRIVE MECHANISM

This invention has to do generally with motion picture shutters, and concerns more particularly drive mechanism for rotary shutters which comprise two shutter members that are mutually adjustable to vary the exposure time, and which may include reflex means for illuminating an optical finder during the periods of film movement.

Although shutter arrangements of that general type are well known, the drive mechanisms which have been previously proposed tend to be unduly complex, are difficult to construct with adequate strength and accuracy, or suffer from other practical disadvantages.

The present invention provides mechanism for mounting and driving rotary shutters of the described type which can be constructed economically, which is inherently rugged and accurate, and which is sufficiently compact to avoid interfering with the optical system of the camera and with the intermittent mechanism for advancing the film.

A well-known type of variable shutter employs a main shaft which carries the rearmost one of the two shutter members and is coupled by suitable gearing to the intermittent mechanism, the forward shutter member being carried by a shaft of relatively small diameter that is journaled coaxially in a bore extending the entire length of the main shaft. Such mechanism places the differential coupling between the two shutter members at the opposite end of the main shaft, where it is readily accessible and where space can be made available. However, it is difficult to design the inner shaft with sufficient strength and rigidity to give fully satisfactory performance.

In accordance with the present invention the forward member of the variable shutter is mounted directly on the main shaft. The rearmost member is carried by a sleeve that surrounds the main shaft coaxially in rotatable relation to it. The drive connection between that sleeve and the main shaft is made via a differential mechanism which typically comprises a parallel countershaft geared directly to the sleeve and geared to the main shaft through a phase adjusting mechanism such as a pair of spiral gears of which one is splined on its shaft for axial movement to vary the angular relation between the two shutter members.

The present invention provides improved drive mechanism for a reflex shutter that is journaled on an axis inclined at about 45° to the optical axis of the camera objective lens. The usual relatively complex gearing by which such a reflex shutter has previously been driven is replaced, in accordance with the present invention, by a simple universal joint of constant speed type, having one member mounted coaxially on the main shaft and the other member mounted coaxially on the inclined shaft of the reflex shutter. When the main shutter is driven in the manner that has been described, the forward end of the main shaft is available for such coupling to the reflex shutter. Due to the inherent ruggedness of the main shaft, the added load of the reflex shutter does not involve any structural problems. The universal joint mentioned above can be replaced, if desired, by suitable gearing or other coupling mechanism.

A full understanding of the invention, and of its further objects and advantages, will be had from the following description of illustrative mechanism for carrying it out. The particulars of that description, and of the accompanying drawings which form a part of it, are intended only as illustration and not as a limitation upon the scope of the invention.

In the drawings:

FIG. 1 is a somewhat schematic horizontal section representing an illustrative embodiment of the invention in a motion picture camera;

FIG. 2 is a vertical section taken generally on line 2-2 of FIG. 1, but developed as indicated by line 2-2 of FIG. 3;

FIG. 3 is a section in the plane of line 3-3 of FIG. 2;

FIG. 4 is a front elevation; and

FIG. 5 is a detail showing a portion of FIG. 1 at enlarged scale.

In the drawings the main frame or housing of the camera is omitted for clarity of illustration, and it is understood that all the shaft bearings and other elements to be described are suitably mounted on such a frame. The objective lens is indicated in fragmentary form at 10, with optical axis 12, and forms an image on the film 14. Film 14 is guided for intermittent movement in a direction normal to the plane of FIG. 1 through a conventional film gate, indicated schematically at 15 with the film aperture 16.

The main shutter shaft 20 is journaled by the bearings 21 and 22 on the shaft axis 24, which is parallel to optical axis 12. Shaft 20 is typically driven via the gears 25 and 26 from the drive shaft 30. That shaft is journaled on the housing by bearings indicated at 32, is driven by a suitable motor via the pulley 33, and typically drives directly the intermittent mechanism 34. The film advancing claw of intermittent mechanism 34 is indicated schematically at 36, and acts in conventional manner to advance film 14 intermittently through the film gate. Registration pins may be provided for defining the film position during its rest periods. The constant speed film sprocket 38 is typically driven by the gearing 39 from main shutter shaft 20, supplying film from the supply reel to the intermittent, and from the intermittent to the takeup reel via respective film loops in conventional manner.

Light from lens 10 is cut off from film 14 during periods of film movement by shutter mechanism which comprises the main shutter member 40, rigidly mounted on shaft 20. That shutter member preferably has only a single vane 42, which typically extends through an angle sufficient to cover the film aperture throughout each period of film movement. Vane 42 is preferably dynamically balanced, as by the counterweight indicated at 44. For some purposes it may be preferred to employ a shutter with two vanes and driven at half the speed of the intermittent mechanism.

In the present structure the effective aperture of the shutter is made variable by means of the second shutter member 50, which is mounted coaxially with shutter member 40 and normally rotates with it, but is angularly adjustable to vary the shutter opening. Member 50 is rigidly mounted on the sleeve 53, which is freely rotatable on main shaft 20 forward of bearing 22 and carries the gear 55. The rotational position of shutter member 50 relative to shaft 20 is controlled by suitable differential mechanism through which sleeve 53 is driven from main shaft 20. A particularly satisfactory form of differential mechanism comprises the countershaft 60, which is journaled by the bearings 62 on the counteraxis 61 parallel to main axis 24. The gear 64 is rigidly mounted on countershaft 60 and continuously engages gear 55, coupling the countershaft to shutter 50 in definite mutual speed and phase relationship. The spiral gear 66 is mounted on countershaft 60 for free axial movement but in fixed rotational relation by the spline structure 67. The axial position of gear 66 on the countershaft is controlled by the mechanism 68, which slides on the fixed rod 65 under manual control, indicated schematically as the handle 69. Gear 66 continuously engages the spiral gear 70 on main shaft 20, the latter gear being typically formed by cutting gear teeth directly in that shaft. Gears 66 and 70 thus couple main shaft 20 and countershaft 67 for rotation at normally fixed relative speed but with mutual phase relationship that is variable in response to axial movement of control handle 69. The pitch and dimensional relationships are selected so that control 69 can shift the two shutter members 40 and 50 from directly overlapping position, providing maximum shutter aperture, to a position in which the shutter aperture is either relatively small, producing minimum available exposure time, or is zero, producing complete closure of the shutter.

A particular advantage of the described shutter and drive mechanism is that the forward end of main shaft 20 is accessible in front of the shutter structure for connection to any further mechanism that is to be driven in timed relation to the shutter and to intermittent movement 34. When the movable shutter member is placed forward of the fixed shutter member, as in many previous variable shutter mechanisms, no such drive connection is available. In those previous mechanisms the forward end of the main shaft is made completely inaccessible by the rotating variable shutter member. Whereas connection might, in theory, be made to the variable shutter itself, the resulting drive, besides its limited strength and accuracy, would be subject to phase variations due to adjustment of the variable shutter.

The present structure includes the reflex shutter 80, which is mounted with the counterweight 87 on the shaft 82, journaled by the bearings 83 on the axis 81. Reflex shutter axis 81 is inclined with respect to optical axis 12 and main shaft axis 24 by the angle indicated in FIG. 1 at 85, which is typically 45°. Reflex shutter 80 is synchronized with main shutter member 40, intercepting light that would otherwise strike vane 42. The intercepted light is specularly reflected by the optically plane front surface 84 of shutter 80, forming at the ground glass or reticle 91 an optical image 90 which corresponds directly to the image on film 14. Image 90 is rendered visible as a finder image by the mirror 92 and the finder optical system indicated schematically at 93.

Reflex shutter 80 on its inclined shaft 82 is illustrative of mechanisms that can conveniently be driven from the forward end of main shaft 20.

The two shaft axes 24 and 81 intersect at the point 86, which is spaced forwardly of main shaft 20 and rearwardly of reflex shaft 82. Accordingly, space is available between those shafts for coupling them directly by any desired type of coupling structure. In accordance with the present invention, the preferred coupling structure for that purpose comprises a universal joint of suitable type that provides constant speed ratio between the two connected shafts.

A particularly suitable type of constant speed universal joint is indicated at 100 and is shown best in FIG. 5. That structure comprises the two balls 102 and 104, each of which has two peripheral grooves 106 and 108 in diametral planes at right angles to each other. The yoke formations 103 and 105 are mounted rigidly on the shafts 20 and 82 and slidingly engage the grooves 106 of the respective balls. The other grooves 108 are slidingly engaged by yoke formations on opposite ends of the coupling member 110, which requires no other support. This type of coupling, though well known in and of itself, is remarkably well adapted for the present purpose by its compactness, simplicity and accuracy, and is quieter in operation than other coupling mechanisms such as bevel gears, for example.

I claim:

1. In combination with a motion picture camera having an objective lens and a film aperture mounted behind the lens on an optical axis, intermittent mechanism for moving a film intermittently past the aperture, and an optical finder; shutter mechanism which includes a variable shutter for varying the ratio of exposure time to dark time and a reflex shutter for illuminating the optical finder during the dark time; said shutter mechanism comprising a main shutter shaft journaled on a shaft axis parallel to the optical axis and rigidly carrying adjacent its forward end a front shutter member, the shaft being drivingly coupled to the intermittent mechanism in definite mutual speed and phase relation, a sleeve journaled on the main shaft and rigidly carrying a rear shutter member closely spaced rearwardly of the front shutter member, the shutter members including respective shutter blades of truncated sector form for intersecting light between the lens and the film aperture in respective mutually parallel, closely spaced blade planes that intersect the optical axis perpendicularly immediately forward of the film aperture and intersect the shaft axis at points spaced forwardly of the forward end of the shaft, and blade supports rigidly mounted on the shaft and on the sleeve, respectively, adjacent the forward ends thereof, and extending therefrom radially outward and axially forward to the respective blade planes and rigidly carrying the respective blades, differential mechanism for driving the sleeve normally at the same speed as the main shaft and for adjustably varying the phase relation between the sleeve and the main shaft to vary the effective shutter opening, a reflex shutter rigidly mounted on a reflex shaft journaled on an axis inclined obliquely to the optical axis, the reflex shutter including reflective vane structure for intercepting light between the lens and said shutter blades and for reflecting intercepted light to the optical finder, shaft axis obliquely intersecting the main shaft axis at an intersection point that is spaced forwardly of the forward end of the main shaft and rearwardly of the rearward end of the reflex shaft, and a constant speed universal joint drivingly interconnecting the rearward end of the reflex shaft and the forward end of the main shaft in definite mutual speed and phase relation, the universal joint being positioned essentially at said intersection point and predominantly to the rear of said blade planes and within the enclosure described by said blade supports.

2. Shutter mechanism as defined in claim 1, and in which said universal joint comprises two members each having two concentric arcuate channels lying in mutually perpendicular planes, yoke structures rigidly mounted on the forward end of the main shutter shaft and on the rearward end of the reflex shaft, respectively, and slidingly engaging channels of the respective members, and a coupling member having two yoke structures mounted at its opposite ends in a common plane and slidingly engaging the other channels of the respective members.